Aug. 21, 1945.     C. L. EKSERGIAN ET AL     2,383,375
BRAKE MECHANISM
Filed June 23, 1944     3 Sheets-Sheet 1

INVENTORS
Carolus L. Eksergian,
Paul W. Gaensste and
BY
John P. Parker
ATTORNEY

INVENTORS
Carolus L. Eksergian and
Paul W. Gaenssle
BY
John P. Darby
ATTORNEY

Aug. 21, 1945.  C. L. EKSERGIAN, ET AL  2,383,375
BRAKE MECHANISM
Filed June 23, 1944   3 Sheets-Sheet 3
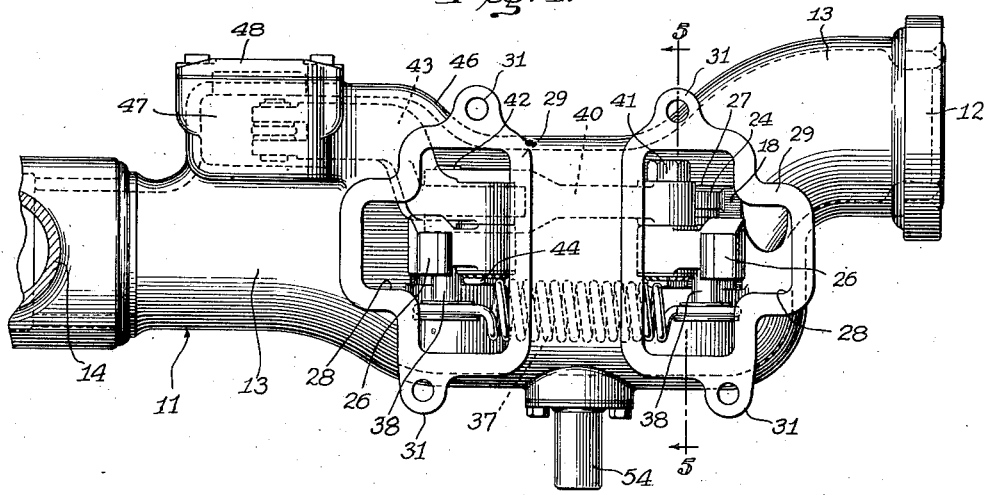
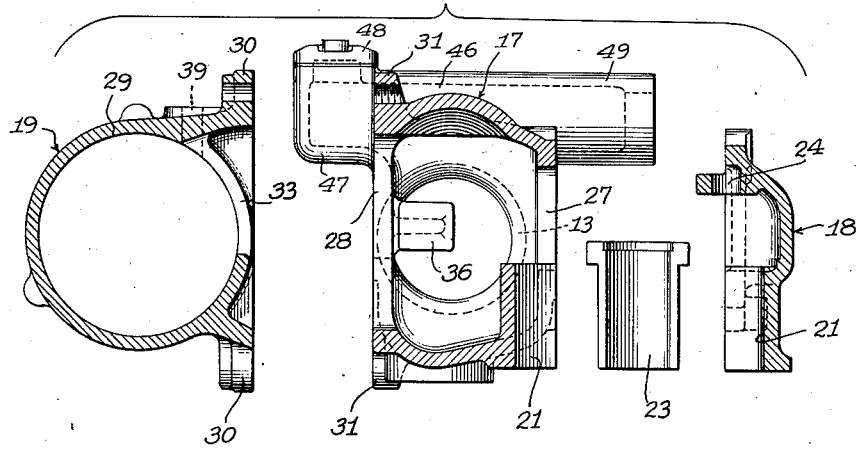
INVENTORS
Carolus L. Eksergian,
Paul W. Gaenssle and
BY
John P. Dunbar
ATTORNEY Patented Aug. 21, 1945

2,383,375

UNITED STATES PATENT OFFICE 2,383,375

BRAKE MECHANISM

Carolus L. Eksergian and Paul W. Gaenssle, Detroit, Mich., assignors to Budd Wheel Company, Philadelphia, Pa., a corporation of Pennsylvania Application June 23, 1944, Serial No. 541,772

8 Claims. (Cl. 188—153)

The invention relates to brake mechanism and particularly to such mechanism associated with a vehicle, such as a railway truck.

The invention relates generally to the type of brake mechanism shown in co-pending application, Serial No. 399,779, filed June 26, 1941, in which a pair of rotary brake discs are associated one with each wheel of a wheel and axle assembly supporting the vehicle frame, and brake shoes cooperate with the opposite faces of each disc to effect the braking. The support for the shoes and their actuating means comprises a yoke-like frame having its ends supported from the ends of the wheel and axle assembly and its central portion connected to the vehicle frame to prevent rotation thereof. In the region of the respective discs the yoke support is provided with enlarged housings, enclosing most of the brake levers and the actuating means therefor.

It is an object of the present invention to provide a brake mechanism of this class which is so constructed and arranged as to be very compact longitudinally and vertically and adapted to fit within the restricted space between the axle and transom of a truck and in which the parts within the housing are readily assembled and disassembled and accessible at all times. The accessibility is made possible by making the main part of the housing a continuous member of the yoke-like frame, with which are removably associated parts on opposite sides thereof, carrying parts of the mechanism, so as to be removable therewith from the main body of the housing formed by said yoke-like frame.

Other and further objects and advantages and the manner in which they are attained will become apparent from the forthcoming detailed description when read in connection with the drawings forming a part hereof.

In the drawings:

Fig. 4 is an enlarged elevational view of the right hand side of the brake support, with the cylinder carrying portion removed; and Fig. 5 is an exploded view of the brake support taken substantially on the line 5—5 as indicated in Fig. 4.

Figure 1:
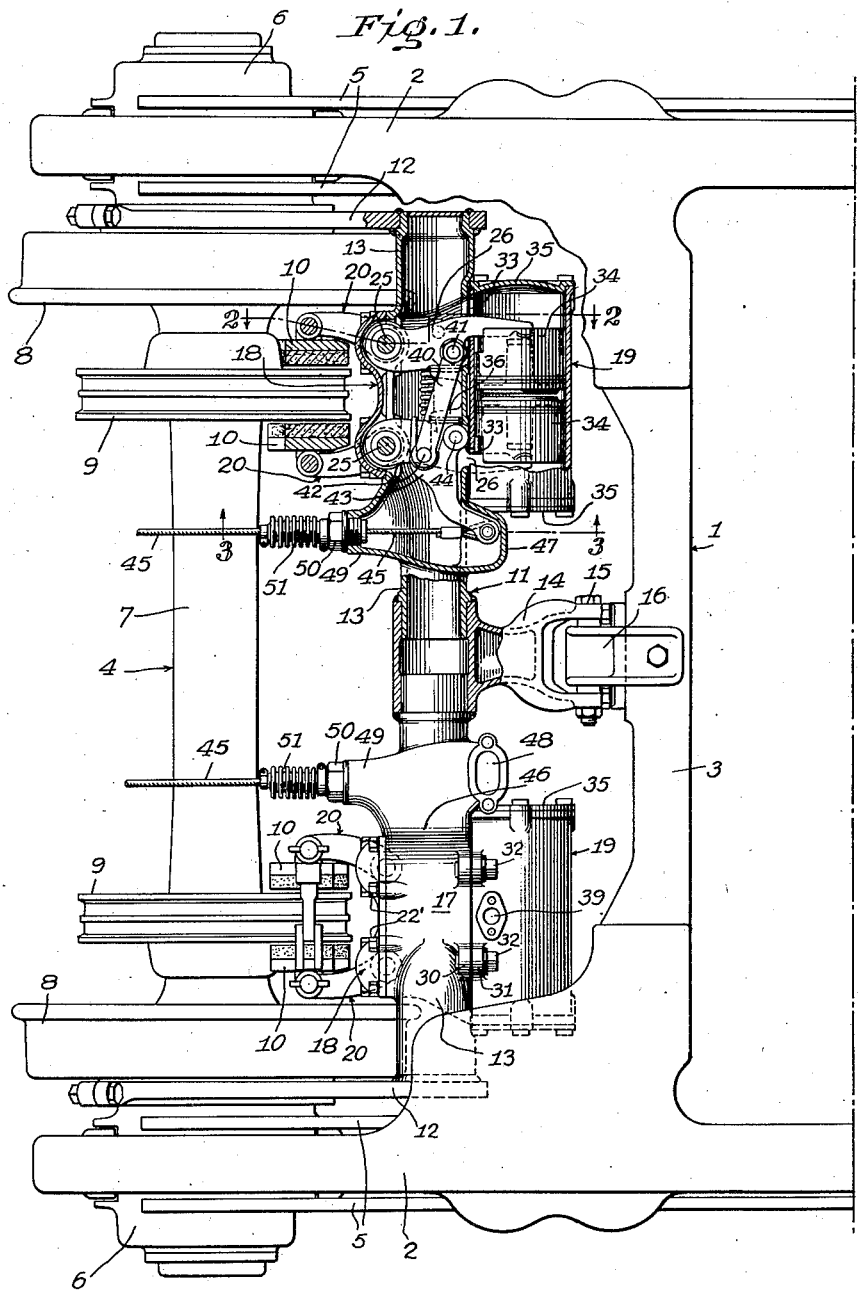
Fig. 1 is a plan view of one-half of a railway truck showing the invention applied thereto, parts being shown in horizontal section.

In the embodiment of the invention selected for illustration, the truck frame is generally indicated by numeral 1 and comprises the longitudinal side members 2 and transoms 3. It is supported from the wheel and axle assembly, generally designated by 4, through the usual equalizer bars 5 having their ends resting on top of the adjacent journal boxes 6 forming parts of said assembly. The wheel and axle assembly further comprises the axle 7 having its ends journaled in the respective journal boxes 6 and wheels 8 having the usual press fit on the axle.

With each wheel is associated to rotate therewith, a rotary brake member, such as the brake disc 9. Brake shoes, such as the segmental shoes 10, are operatively associated with the opposite faces of each disc 10 and it is with the support means for these shoes and their operating mechanism that the invention is mainly concerned.

As in the hereinbefore referred to application, the brake support generally comprises a C or U-form yoke-like frame, designated 11, having longitudinally extending arms 12 at its ends mounted on the adjacent axle box 6 and interconnected by a transverse member, as the member 13 of tubular cross-section closed at its ends. As shown, the yoke-like frame is prevented from rotating about the axle by a torque arm 14 secured to the central portion of the tubular member and articulated by any suitable connection 15 to a bracket 16 on the adjacent transom 3.

It will be noted that the transverse member 13 extends in close adjacency to the peripheries of the discs 9 and in the region of each disc it is enlarged to provide a closed housing for the brake mechanism.

For convenience of assembly and access to the housing, while yet keeping it as compact and light as possible, each housing is preferably comprised of three sections, a central section 17 formed by a through running section of the transverse member, a lever bearing section 18 and a brake cylinder carrying section 19, see Figs. 1 and 5. The three sections are joined together along substantially vertical planes at opposite sides of the central section.

The brake levers, as 20, carrying the respective shoes 10 in a manner which need not be described in detail, being similar to the brake shoe mounting disclosed and claimed in copending application, Serial No. 529,730, filed April 6, 1944, are pivotally mounted in the plane of joinder between sections 17 and 18. Each of the sections 17 and 18 is formed for this purpose with one-half of a main bearing, designated 21, which, when the sections 17 and 18 are joined together, as by bolts 22', receives the fulcrum portion 22 of the respective levers. A suitable bearing liner, as 23, which is also split but in a direction preferably at right angles to the split of the main bearing, is applied before the sections are joined together. At the top the part 18 is formed with a small diameter supplemental bearing 24 for each lever, which is adapted to receive an end trunnion 25 on the lever fulcrum aligned with the axis of the main bearing, see Figs. 2 and 5.

With this arrangement, the two levers associated with each disc may be assembled with the casing portion 18 and brought into place by passing their arms 26 through the openings in the opposed walls of the housing section 17, these openings being designated respectively 27 and 28, see Figs. 4 and 5, and finally securing the sections together by tightening the bolts 22. It will be understood that the seats around the openings are machined so that a tight joint is made between the sections, which may be further secured by providing a suitable gasket, not shown.

With the levers so assembled with the housing, the free ends of their arms 26 project through the openings 28 in the wall of the section 17 into position for engagement by the actuating cylinder.

As shown, this cylinder is formed integrally with the section 19 which has machined seating face 5 adapted to mate the similarly machined seating faces 29 formed around the openings 28, the mating faces having ears 30 and 31 respectively, at top and bottom, through which they are bolted together, as by bolts 32. To insure a tight joint, a suitable gasket (not shown) may be provided.

Figure 2:
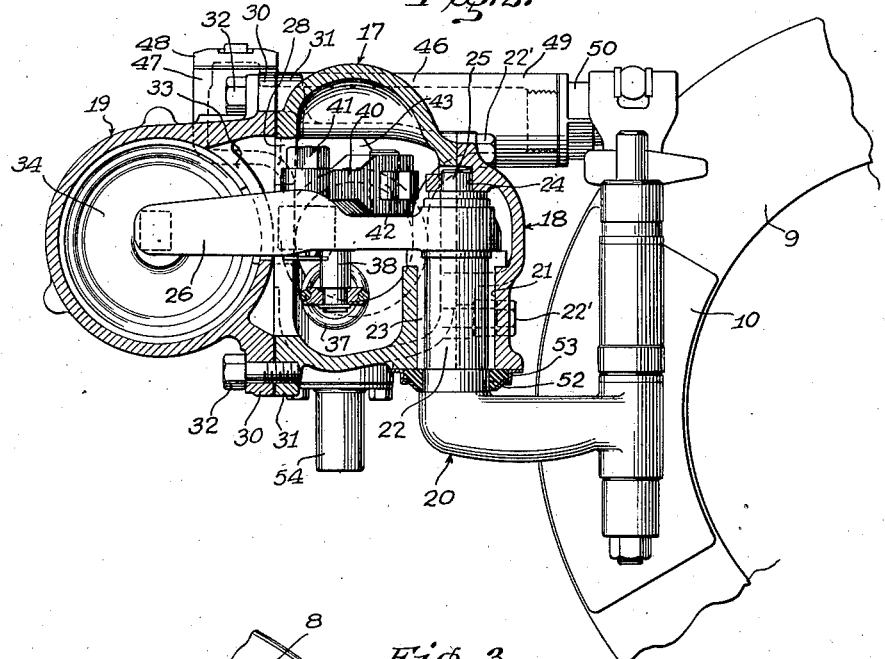
Fig. 2 is an enlarged detail vertical sectional view taken substantially along the line 2—2 of Fig. 1.
Figure 3:
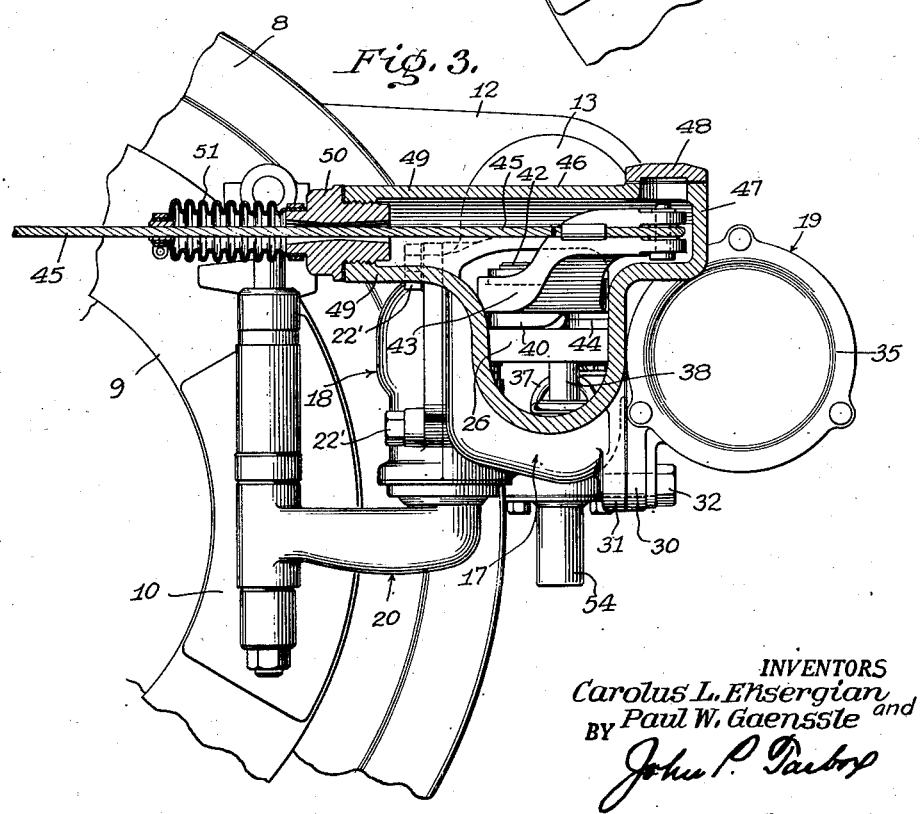
Fig. 3 is a similar detail vertical sectional view taken substantially along the line 3—3 of Fig. 1.

By reference to Figs. 2 and 5, it will be noted that the cylindrical wall of the cylinder is to one side of the plane of the attaching face, and is provided with openings, as 33, for the passage of the lever arms. A pair of pistons, as 34, slide in the bore of the cylinder, one for coaction with the end of each of the lever arms 26, see Fig. 1. The skirts of the pistons may be cut away to provide clearance for the arms. The ends of the cylinder are closed by removable closures, 35, which can be removed to gain access to the inside of the cylinder without dismounting the cylinder section 19.

To maintain the lever arms 26 suitably spaced apart during assembly and disassembly, a suitable stop lug or lugs 36 may be formed to project from the wall of the section 17 between the openings 28 therein. This wall additionally stiffens the section of the tubular section 17. To return the levers to inoperative position against the stop lug or lugs 36, a tension spring 37 is provided extending within the housing between the lever arms 26, and secured to each at its opposite ends by a vertical pin 38 secured to each lever arm.

If the brake is to be used without manual or emergency operation, the structure so far described is all that is required for operation. The cylinder has a suitable port 39 which opens into the space between the pistons, and through which compressed fluid, as air, may be admitted for actuating the brakes.

If emergency or manual actuation is desired, in addition to, or in conjunction with the fluid actuation of the brakes, such manual actuating means is also desirably enclosed in the main in said housing. To this end, the housing may be made of sufficient height to receive the manual actuating means above the lever arms 26. Such means may comprise a link 40, connected at one end through pivot 41 to one of the arms 26 and having its other end pivoted at 42 to a bell crank lever 43, in turn pivoted at 44 to the arm 26 of the other lever. To bring the end of the actuating arm of the bell crank high enough to have the longitudinally extending cable 45 connected to it clear the axle at all times, this end is upwardly offset and the housing is formed with a similar offset portion 46 to receive it. To allow for the necessary swing of the bell crank, the housing is also formed with a longitudinal offset portion 47 to receive the correspondingly offset end of the bell crank, see Fig. 1. Opposite the connection of the cable to the bell crank, the housing may be provided with an opening provided with a removable cover 48 so that ready access may be had at any time to this connection.

Opposite the offset portion 47, the housing has an extension 49 in the opposite direction longitudinally of the truck and this extension is provided with a guiding bushing 50 screwed thereinto for the cable. The opening for the cable is preferably sealed, and this may be done by providing an extensible flexible boot 51 having one end secured to a reduced extension of the bushing and having its other end clamped to the cable.

It will be understood that the longitudinally extending cables 45 from the brake mechanism at opposite ends of the axle extend to a suitable manual operating means and the braking at said ends may be equalized by inserting a suitable equalizer between the two cables.

By the arrangement shown and described the brake levers may be made as integral forgings having their arms offset along the fulcrum and the opening for the fulcrum is provided only in the bottom of the housing where it can be very effectively sealed by a rubber or other flexible seating ring 52 held in place and protected by a sheet metal annulus 53 secured to the housing about said opening.

Preferably, to prevent the building up of objectionable pressure inside the housing, when the pistons are displaced to operate the brake, a small opening is provided in the bottom of the housing, which is closed by a breather cap 54, provided with a suitable filter. This allows air to pass from or into the housing with the movements of the pistons, without allowing any foreign matter to be drawn into the housing. Since such devices are well-known in the art, the details have not been shown and described.

While a specific embodiment of the invention has been herein shown and described, it will be understood that changes and modifications may be made by those skilled in the art without departing from the main features of the invention, and such changes and modifications are intended to be covered in the appended claims.

What is claimed is:

1. In a brake arrangement, a vehicle frame, a supporting wheel and axle assembly, a brake disc mounted for rotation with each wheel of said assembly, brake shoes arranged for cooperation with the opposite faces of said discs, and a support for said shoes carried at its ends by said wheel and axle assembly and connected to the vehicle frame to prevent rotation thereof, said support comprising a transverse member adjacent the peripheries of said discs and in the region of each disc being expanded to form a closed housing, brake levers pivoted in each housing and carrying respective shoes, a demountable brake cylinder forming a part of said housing for actuating said levers, and manual actuating means also enclosed in said housing comprising a lever and link connected to said brake levers, and means connected to said lever extending outside the housing in a direction longitudinally of the vehicle.

2. In a brake arrangement, a vehicle frame, a supporting wheel and axle assembly, a brake disc mounted for rotation with each wheel of said assembly, brake shoes arranged for cooperation with the opposite faces of each disc, and a support for the shoes comprising a transverse member arranged adjacent the peripheries of said discs and providing expanded housings in the region of said discs, each housing being divided along transverse vertical planes into three parts, brake levers pivotally mounted along one of said planes of division and a brake cylinder for actuating said levers carried by a part removable along the other plane of division.

3. In a brake arrangement, a vehicle frame, a supporting wheel and axle assembly, a brake disc mounted for rotation with each wheel of said assembly, brake shoes arranged for cooperation with the opposite faces of each disc, and a support for the shoes comprising a transverse tubular member arranged adjacent the peripheries of the discs and extending laterally beyond them, said tubular member being expanded to form a housing adjacent each disc, said housing comprising a central portion extending continuously from side to side, and portions removably associated with the opposite sides of said central portion, brake levers carrying the associated shoes pivotally carried between said central portion and the adjacent removable portion and having arms extending through said central portion, and a brake cylinder carried by the other removable portion, and pistons therein in cooperative relation to said arms.

4. In a brake arrangement, a vehicle frame, a supporting wheel and axle assembly, a brake disc mounted for rotation with each wheel of said assembly, brake shoes arranged to cooperate with the opposite faces of each disc, and a support for said shoes comprising a tubular transverse member arranged adjacent the peripheries of said discs, and expanded in the vicinity of each disc to form a housing, each of said housings pivotally mounting brake levers cooperating with respective shoes and including as a part thereof a demountable brake cylinder cooperating with said levers, the housing being divided in a vertical plane passing through the pivotal mounting of the levers and in a second vertical plane into parts, one of which carries the brake cylinder.

5. In a brake arrangement, a vehicle frame, a supporting wheel and axle assembly, a brake disc mounted for rotation with each wheel of said assembly, brake shoes arranged to cooperate with the opposite faces of each disc, and a support for said shoes comprising a tubular transverse member arranged adjacent the peripheries of said discs and having, in the regions of said discs, housing portions, each said housing portions having brake levers pivotally mounted thereon cooperating with respective shoes and being divided by a generally vertical plane into at least two parts, one of said parts carrying a brake cylinder device for actuating said levers.

6. In a brake arrangement, a vehicle frame, a supporting wheel and axle assembly, a brake disc mounted for rotation with each wheel of said assembly, brake shoes arranged to cooperate with the opposite faces of each disc, and a support for said shoes comprising a transverse member adjacent the peripheries of said discs expanded into enlarged housings, one adjacent each disc, each of said housings carrying a brake cylinder, and brake levers actuated thereby and operatively engaged with respective shoes, said levers having main vertical fulcrum portions and the housing being vertically split in the plane of said portions to provide parts each carrying half of the bearings cooperating with said fulcrum portions, one of said parts carrying a second bearing axially aligned with the main bearing and cooperating with a corresponding trunnion portion on the associated lever.

7. In a brake arrangement, a wheel and axle assembly, a rotary brake member rotatable therewith, a non-rotary brake member in cooperative relation with said rotary member, a support for said non-rotary member comprising a closed housing enclosing a brake cylinder device, a brake lever actuated thereby, and cooperating with said non-rotary member, force multiplying means for actuating said lever independently of the cylinder device, an element extending transversely of said support, connected to said force-multiplying means and extending through a similarly extending opening to the outside of the housing, and expandable and contractible sealing means connected to said housing and said element for sealing said opening in all positions of said element.

8. In a brake arrangement, a vehicle frame, a supporting wheel and axle assembly, a brake disc mounted for rotation with each wheel of said assembly, brake shoes arranged to cooperate with the opposite faces of each disc, and a support for said shoes comprising a transverse member arranged adjacent the peripheries of said discs and having in the region of said discs, housing portions, brake levers pivotally mounted on said housing portions and cooperating with respective shoes, said housing portions each being divided in a substantially vertically extending plane into a main portion carrying said levers and a brake cylinder portion, and the levers having arms extending through spaced openings in the wall of said main portion adjacent said cylinder portion, into the cylinder portion.

CAROLUS L. EKSERGIAN.
PAUL W. GAENSSLE.